INVENTOR
KENNETH E. BURG

United States Patent Office 3,539,983
Patented Nov. 10, 1970

3,539,983
METHOD AND APPARATUS FOR RECORDATION OF SHALLOW AND DEEP SEISMIC REFLECTION DATA
Kenneth E. Burg, Dallas, Tex., assignor to Texas Instruments Incorporated, Dallas, Tex., a corporation of Delaware
Filed Apr. 16, 1969, Ser. No. 816,636
Int. Cl. G01v 1/24
U.S. Cl. 340—15.5          12 Claims

ABSTRACT OF THE DISCLOSURE

A first array of closely spaced seismic receivers generate first electrical signals in response to the reception of seismic reflections from relatively shallow subsurface horizons. A second array of widely spaced seismic receivers generate second electrical signals in response to the reception of reflections from relatively deep subsurface horizons. A timer circuit switches a set of recording channels between the outputs of the first and second arrays in order that reflections from the shallow subsurface horizons may be first recorded on the recording channels and then followed by the later arriving reflections from the relatively deep subsurface horizons.

---

This invention relates to seismic exploration, and more particularly to the sequential recording of seismic data from multiple seismic detector arrays on common recording channels.

It is common practice in seismic exploration to obtain data from relatively shallow subsurface reflecting horizons by receiving the reflected seismic signals with a plurality of closely spaced seismic detectors. An example of a typical detector array for obtaining data from shallow reflecting horizons comprises twenty-four detectors each spaced 50 to 100 feet apart, in a linear array with an overall length of from 1150 to 2300 feet, the first detector being disposed only 50 to 100 feet from the seismic disturbance source location.

More recently, it has been found advantageous both in land and marine seismic exploration to use long seismic detector arrays disposed along a line covering typical distances of between 6000 to 10,000 feet. For instance, in practice twenty-four detectors have been spaced about 300 feet apart to cover a total distance of 6900 feet on the surface of the earth, with the first detector being disposed 300 feet from the seismic source. In other typical cases, the first detector in a long spread may be placed as much as 1800 feet from the seismic source. In marine exploration for oil, it is common to have twenty-four hydrophones spaced 100 meters apart in an array 2300 meters long, with the first hydrophone disposed about 300 meters from the seismic source.

These long, widely spaced detector spreads have been adopted to cover more of the subsurface with each seismic recording and also to eliminate undesirable events such as multiple reflections, defractions, coherent noise and the like. The use of such long detector spreads has resulted in the development of reflections from large structures extremely deep in the subsurface, as great as 20,000 to 30,000 feet, and has found particular use in special data processing techniques such as the common depth point method described in U.S. Pat. 2,732,906, issued to Mayne on Jan. 31, 1956.

However, the use of such widely spaced, long seismic detector spreads has tended to discriminate against obtaining meaningful seismic reflection data from relatively shallow subsurface interfaces. Thus, in an effort to obtain data from both shallow and deep reflecting horizons with a single impulse from a seismic disturbance source, it has been a common practice to record deep data on twenty-four record traces from twenty-four detectors spaced apart by long distances and to simultaneously record shallow data on separate traces from additional closely spaced detectors located near the seismic source. The additional recording channels for the shallow data requires additional amplifiers, filters, oscillographs and the like. Further, the additional recording channels have, in the case of recording of data in digital format, required special digital circuitry and modifications in the digital tape format, with resulting increase in consumption of magnetic tape and computer time.

It has also been heretofore known to switch between adjacently disposed refraction and reflection seismometers in order to provide refraction first break information along with reflection data. An example of such a system is described in the U.S. Pat. 3,212,599 issued to Johnsen on Oct. 19, 1965. However, such systems do not switch between two multiple output arrays and do not make available simultaneous recordations of both shallow and deep reflection data without the necessity of additional amplifying and recording channels.

In accordance with the present invention, a first array of spaced apart seismic receivers generate a plurality of first electrical signals in response to seismic reflections from relatively shallow subsurface horizons. A second array of seismic receivers are spaced apart by greater distances than the receivers of the first array and generate a plurality of second electrical signals responsive to reflections from relatively deep subsurface horizons. Representations of the first electrical signals are recorded on recording channels prior to the generation of said second electrical signals. Subsequently, the recordation of the first electrical signals is terminated and recordation of representations of the second electrical signals is initiated on the recording channels.

In accordance with another aspect of the invention, timing structure is provided to sequentially switch the data being recorded on ones of the recording channels from shallow reflected data to deep reflected data according to preselected criteria. Representations of shallow reflected data on certain recording traces are recorded for longer time intervals than on other recording traces in dependency upon the quality of the pesently available deep reflected data.

In accordance with another aspect of the invention, the amplifying gain provided for the outputs of the seismic detectors is varied in accordance with the type of the seismic data being recorded.

For a more complete understanding of the present invention and for further advantages and objects thereof, reference is now made to the following description taken in conjunction with the accompanying drawings, in which.

Figure 1:
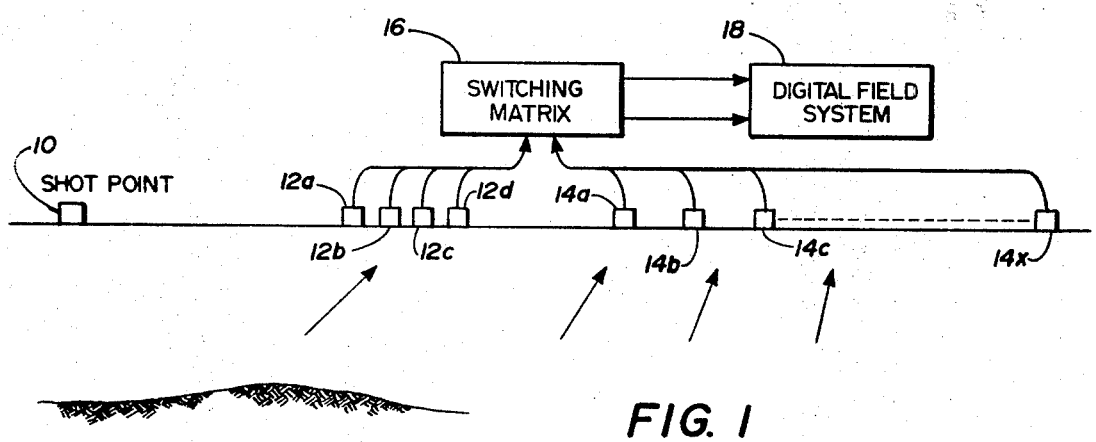
FIG. 1 is a somewhat diagrammatic illustration of a seismic exploration system according to the invention utilizing a pair of arrays for receiving both shallow and deep reflection data.

FIG. 1 illustrates a typical embodiment of the invention including a seismic disturbance source 10, which may for instance comprise a dynamite shot. The seismic disturbances generated by the source 10 are reflected from relatively shallow reflecting horizons and received by a first detector array comprising detectors 12a–d. Reflections of the seismic disturbance from much deeper reflecting horizons are subsequently received by a second more widely spaced apart array of seismic detectors 14a–x.

The outputs of both the first and second arrays are applied through a switching matrix 16 to a digital field system 18 for recording and processing. The switching matrix 16 operates in the manner to be subsequently described to initially record shallow data from the detectors 12a–d on certain recording channels and then to record deeper data from detectors 14a–x on the same recording channels. The digital field system 18 comprises a multichannel recorder, typically a 24-channel magnetic tape recorder, in addition to digital processing circuitry. An example of a suitable digital recording and processing system is the system manufactured and sold under the trade name Digital Field System by Texas Instruments Incorporated of Dallas, Tex., and as described in U.S. Pat. No. 3,075,607 issued to Aitken et al. on Jan. 29, 1963.

In a typical embodiment of the invention, detectors 12a–d are disposed 50–100 feet from one another. Detectors 14a–x will typically be spaced apart by about 300 feet, with the array covering a total distance of about 6900 feet along a linear path.

Figure 2:
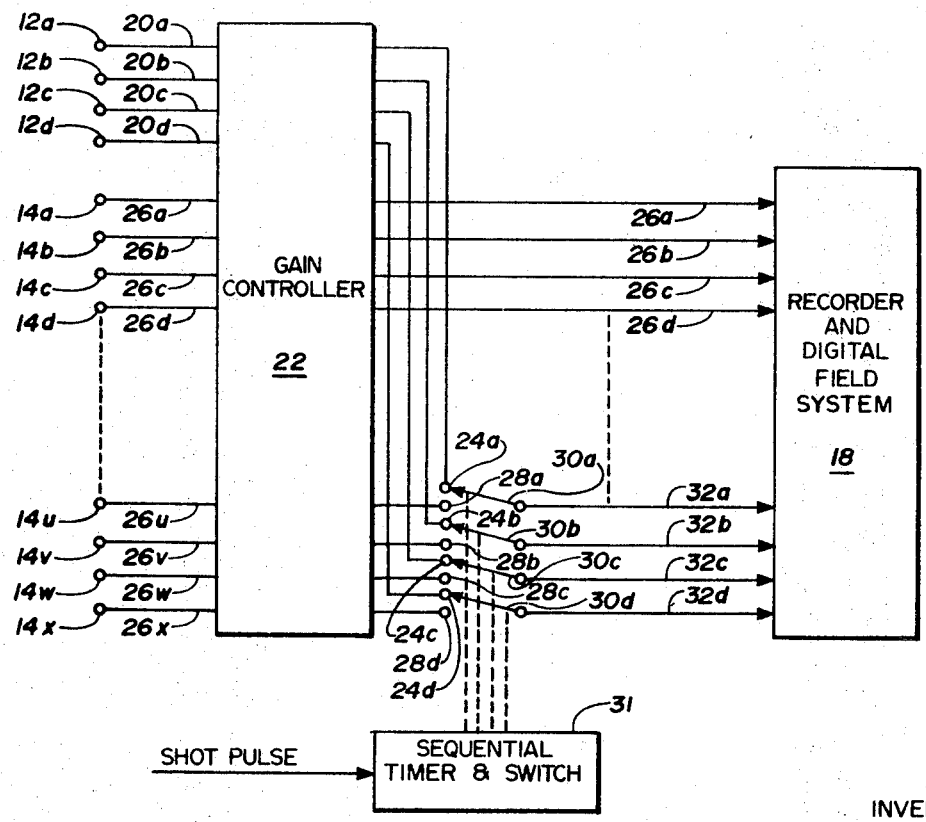
FIG. 2 is a block diagram of one embodiment of the invention involving switching between two seismic receiver arrays.

FIG. 2 illustrates a block diagram of one embodiment of the invention for recording the outputs of the two arrays shown in FIG. 1. The first array of four detectors 12a–d generates electrical signals which are fed through leads 20a–d through a gain controller 22 and to switch terminals 24a–d, respectively. The second array of twenty-four detectors 14a–x, only eight of which are shown for simplicity of illustration, are fed through leads 26a–x to another section of the gain controller 22. Twenty leads 26a–t are fed directly through the gain controller 22 to a recorder located in the digital field system 18 for recording on twenty separate parallel recording channels. Leads 26u–x are fed through the gain controller 22 to switch terminals 28a–d. Switch arms 30a–d are movable between the respective switch terminals 24a–d and 28a–d, and are connected by leads 30a–d to separate channels of the recorder in the digital field system 18. It will of course be understood that an analog recorder could be utilized in place of the digital recorder.

Each of the switch arms 30a–d are individually operated by a sequential timer and switch energizer circuit 31. The circuit may, for instance, comprise a plurality of solenoids which are selectively operable to operate the switch arms 30a–d in the well-known manner. Although mechanically operable switch arms 30a–d are shown for simplicity of illustration, it will be understood that in some embodiments it will be desirable to utilize electronic switches, such as electronic diode switches and the like.

The energization of the solenoids or other circuits which control the switch arms 30a–d are controlled by conventional electronic timing circuitry. The timing circuitry provides energizing pulses after preset timing intervals initiated by the receipt of the shot pulse which represents the instant of detonation of the shot. The timing intervals of the circuitry may be adjustable by potentiometers or the like, to allow the use of the circuitry in various applicatitoins. An example of a timing system capable of generating a number of sequential electrical energizing signals according to positions of a number of manually operated selector knobs is described in U.S. Pat. No. 3,133,231, issued on May 12, 1964 to Fail et al. Alternatively, monostable multivibrators having adjustable timing intervals may be utilized, the timing intervals being initiated by the receipt of the shot pulse.

The gain controller 22 is operable to provide a lower gain to the electrical signals provided through the leads 20a–d from the short interval detectors 12a–d than the gain applied to the signals provided via leads 26a–x from the long interval detectors 14a–x. The short interval detectors 12a–d are located closer to the seismic disturbance source and the reflections are recorded from a shallower depth, and therefore generate relatively higher signal levels than the signal levels generated from the more distantly located long interval detectors 14a–x which record the weaker deep reflections.

In the simplest aspect of the invention, the gain controller 22 comprises a first section having a selected low amplificatiton through which the electrical signals on leads 20a–d are fed. A second amplification section having greater gain amplifiers the electrical signals on leads 26a–x. However, it is within the purview of the invention to provide programmed gain control for the gain controller 22 in order to prevent over-driving the recorder. In this aspect of the invention, individual gain control is provided for each information channel fed through the gain controller 22 in a conventional manner. An example of a variable gain amplifier for use with seismic signals is disclosed in U.S. Pat. 3,083,341 issued Mar. 26, 1963 to White et al. Gain control could also be provided by simpler devices such as potentiometers or attenuators.

In operation of the circuit shown in FIG. 2, switch arms 30a–d are initially placed in the illustrated position in order to connect the outputs of the short interval detectors 12a–d to the last four recording channels of the recorder. The remaining twenty recording channels of the recorder are connected to receive the outputs from the long interval detectors 14a–t. Upon generation of a seismic disturbance, seismic data is first received by the detectors 12a–d and is fed through the gain controller 22 via leads 20a–d, through the switch arms 30a–d and through the leads 32a–d to the last four recording channels of the recorder.

Subsequently, deep reflection signals are received at the long interval detectors, detector 14a being closest to the shot and thus first receiving reflected data. The resulting electrical signal is fed via lead 26a through the gain controller 22 for recording on a recording channel of the recorder. Subsequently, others of the long interval detectors 14b–x receive deep reflection data. The sequential timer circuitry 31 is actuated by the shot pulse to begin their timing cycles. The timing cycles are set so that the switch arms 30a–d are actuated just before the arrival of seismic data to the detectors 14u–x.

After switching of the switch arms 30a–d is completed by the circuitry 31, signals are received by the detectors 14u–x and electrical data is fed via leads 26u–x through the switch arms 30a–d and leads 32a–d to the recording channels in the recorder. As the detectors 14u–x are spaced from the shot location at different intervals, the switch arms 30a–d are sequentially switched. Thus, the switch arm 30a is closed on contact 28a before the switch arm 30b is closed on the switch contact 28b, and so forth.

Figure 3:
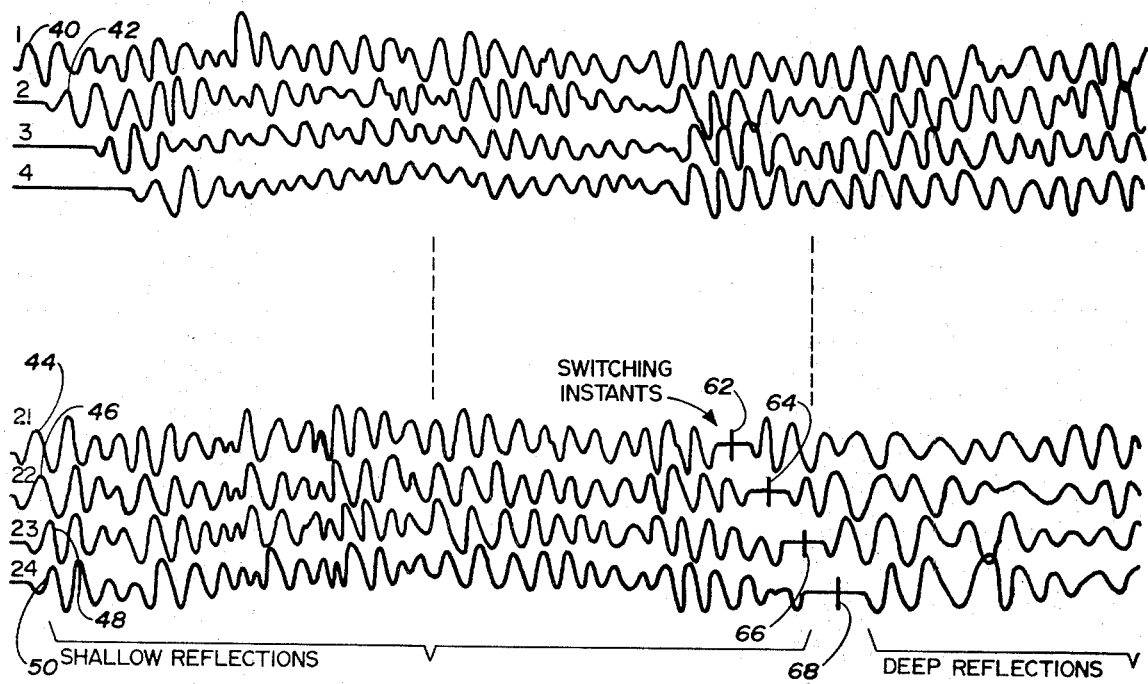
FIG. 3 is a representation of a portion of a seismic record provided by the invention.

FIG. 3 is a representation of a recorder output having twenty-four recording channels, only recording channels 1–4 and 21–24 being shown for simplicity of illustration. Recording channels 1–20 are directly connected through leads 26a–t to receive electrical signals directly from the long interval detectors 14a–t. Thus, the recording channels 1–20 receive only reflections from relatively deep horizons. As the long interval detector 14a is closest of the long interval detectors to the shot point, a first break signal 40 is first detected and recorded on channel 1. Detector 14b then generates an electrical representation of a first break 42 which is recorded on channel 2. The remaining recording channels 3–20 subsequently receive data in the same manner. The illustrated traces on channels 1–20 provide excellent information of relatively deep reflecting horizons.

As the long interval detectors become more distantly spaced from the shot point, greater amounts of record time on the recording channels becomes available for use. For instance, in marine seismic exploration, the first break is received by a detector spaced 300 meters from the seismic source after 0.2 second, while the detector spaced 2700 meters from the source detects a first break only after 1.8 seconds. Thus, in the recording channels 21–24, a substantial amount of recording time is available for the recording of the seismic data from the short interval detectors 12a–d.

As previously noted, the detectors 12a–d are initially connected by the relay switches 30a–d to recording channels 21–24. Thus, recording channel 21 is provided with a first break 44 which was detected by the detector 12a located closest to the shot point. Subsequently, first breaks 46–50 are detected and recorded on recording channels 22–24. Reflections from relatively shallow horizons are then recorded on each of the recording channels 21–24 to provide meaningful data of the shallow reflecting horizons.

When reflections from the deeper reflecting horizons are due to be received at detectors 14u–x, the switch arms 30a–d are sequentially switched by the timer and switch circuitry 31 to connect the detectors 14u–x to the recorder. This switching is accomplished on recording channel 21 at the instant designated by the numeral 62, and subsequently on recording channels 22–24 at switching instants 64–68. Subsequent to each switching instant, data from the deeper reflecting horizons are recorded on the recording channels. Although sequential switching instants 62–68 have been illustrated, it will be understood that by providing only a single timing circuit in circuitry 31, simultaneous switching could be accomplished on all four channels 21–24 if desired. It will be noted that due to operation of the two sections of the gain controller 22, the amplitudes of the shallow reflection data are generally similar to the amplitudes of the deeper reflection data.

In some instances, there will be additional periods of time in which to record shallow reflection data according to the invention between the detonation of the shot and the arrival of the first readily usable reflections received by the long interval detectors. This is due to the fact that it is often difficult to obtain data from relatively shallower reflection horizons wtih the wide interval detectors, because of the lack of recognizable continuity over the wide detector interval and additionally due to destructive interference. Thus, as the initial seismic arrivals received by the wide interval detectors 14u–x will often not be usable, additional shallow reflection data may be thus recorded on channels 21–24. This additional time period may be between 1 and 1.6 seconds.

Figure 4:
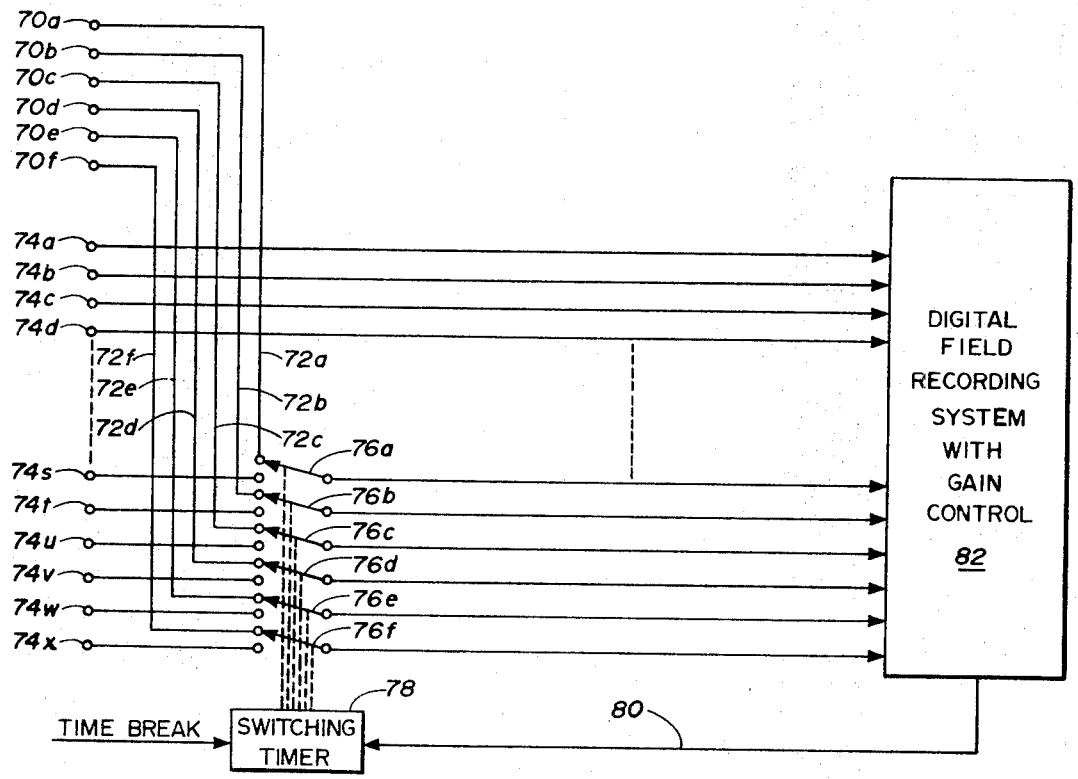
FIG. 4 is a block diagram of another embodiment of the invention utilizing a switching control from recorded data.

FIG. 4 illustrates a block diagram of a second embodiment of the invention wherein gain control of the received signals is accomplished within the digital field system. In this embodiment, switching control of the recording channels is accomplished from the digital field system. This embodiment utilizes six short interval detectors 70a–f which generate electrical signals through leads 72a–f. Twenty-four wide interval seismic detectors 74a–x, only ten of which have been shown for simplicity of illustration, are disposed apart at wide intervals at relatively long distances from the shot in the manner previously described.

Detectors 74a–r are directly connected to the digital field recording system 82 for continuous recordation on eighteen separate recording channels. Wide interval detectors 74s–x are connected to terminals of six relay switches. Relay switch arms 76a–f are each movable between two switch positions in order to selectively switch either the short or wide interval detectors into the last six recording channels. The switch arms 76a–f are controlled by a switching timer circuit 78 in the manner previously disclosed. The switching timer 78 is controlled by information fed via lead 80 from the digital field recording system 82.

In addition to provision of gain control to the seismic signals received within the digital field recording system 82, it will also be desirable in some applications to utilize variable filtering techniques. The shallow seismic data received by the present system will generally comprise high frequency information, and thus wide passband filtering techniques will be performed on this data within the system 82. The relatively deep seismic data will comprise lower frequencies, and thus narrow passband filtering will be performed on this data within the system 82. Variable filtering may also be practiced with the embodiment shown in FIG. 2.

In operation of the system shown in FIG. 4, switch arms 76a–f are normally in the illustrated position such that shallow seismic data received by detectors 70a–f are recorded upon the last six recording channels of the digital field recording system. Gain control is provided to the electrical signals fed through these channels to prevent overdriving of the recording system. This gain control circuitry may comprise any conventional circuitry, such as that found in the digital field system manufactured and sold by Texas Instruments Incorporated of Dallas, Tex.

When the recording system 82 detects usable seismic signals being received from detectors 74q and 74r, for instance, an indication is fed via lead 80 to the switching timer 78. Timer 78 then initiates switching of switch arms 76 to receive electrical signals from the long interval detectors 74s–x. Preferably, the switching is done sequentially in the manner previously described in order to utilize to the greatest degree possible the recording space on the last six channels. When the long interval detectors 74s–x are switched into the input of the recorder, the gain control system within the circuit 82 increases the gain applied thereto in order to properly drive the recorder.

Altough the invention has been described with the use of four and six short interval detectors, it will be understood that such description is for simplicity of description only, and that greater or lower numbers of short interval detectors may be used.

Whereas the present invention has been described with respect to several specific embodiments thereof, it is understood that various changes and modifications will be suggested to one skilled in the art, and it is intended to encompass such changes and modifications as fall within the scope of the appended claims.

What is claimed is:
1. A seismic exploration system comprising:
  (a) means for generating seismic disturbances,
  (b) a plurality of arrays of seismic detectors, each array having different spacings between said detectors,
  (c) recording means having recording channels connected to the outputs of detectors in one of said arrays, ones of said recording channels being connected through switch means to the outputs of detectors in another of said arrays, and
  (d) means for operating said switch means while recording representations of each seismic disturbance for initial recording of outputs from one of said arrays and for subsequent recording on common recording channels of the outputs from another of said arrays.

2. The system of claim 1 wherein said means for operating is dependent upon a preselected timer for switching between said arrays.

3. The system of claim 1 wherein said means for operating is dependent upon reception of outputs from ones of the detectors of said second array for switching between said first and second arrays.

4. The system of claim 1 and further comprising:
  a variable amplification means disposed between said arrays and said recording means, and means for varying said amplification means in dependency upon the signal level from said arrays.

5. A seismic exploration system for recording reflections from seismic disturbances comprising:
 (a) a first array of spaced apart seismic detectors for generating a plurality of first electrical signals in response to seismic reflections from relatively shallow subsurface horizons,
 (b) a second array of seismic detectors spaced apart by greater distances than the detectors of said first array for generating a plurality of second electrical signals responsive to reflections from relatively deep subsurface horizons,
 (c) means for recording representations of said first electrical signals on separate recording channels prior to recordation of ones of said second electrical signals, and
 (d) means for terminating recording of said representations of said first electrical signals and initiating recording of representations of said second electrical signals on said separate recording channels.

6. The seismic exploration system of claim 5 and further comprising:
 means corresponding to each of said recording channels and responsive to a different one of said second electrical signals for terminating the recording of one of said first electrical signals.

7. The seismic exploration system of claim 6 and further comprising:
 timing means for sequentially switching between the recording of said first electrical signals to said second electrical signals.

8. The seismic exploration system of claim 5 and further comprising:
 gain control means operable to vary the amplification applied to said first and second electrical signals.

9. The seismic exploration system of claim 5 and further comprising:
 a plurality of parallel recording channels, only a portion thereof being utilized for recording of said first electrical signals and each of said plurality being utilized for recording of said second electrical signals.

10. The method of recording seismic exploration data comprising:
 (a) generating a seismic disturbance,
 (b) receiving reflections of said seismic disturbance from relatively shallow subsurface horizons through a first detector array and recording representations of said shallow reflections on a plurality of recording channels,
 (c) receiving reflections from said seismic disturbance from relatively deep subsurface horizons through a second detector array and subsequently recording representations of said deep reflections on said recording channels after said shallow reflections.

11. The method of claim 10 and further comprising:
 initially recording said shallow and deep reflections on different recording channels, and
 subsequently terminating recordings of said shallow reflections and initiating recording of said deep reflections on said recording channels.

12. The method of claim 10 and further comprising:
 varying the amplification of said reflections in dependence upon the signal level thereof.

References Cited
UNITED STATES PATENTS
3,284,769  11/1966  Skelton _____ 340—15.5

RODNEY D. BENNETT, Primary Examiner
W. T. RIFKIN, Assistant Examiner